April 5, 1938.   B. J. ALLEN   2,113,071
STABILIZER FOR VEHICLES
Filed Jan. 6, 1936   3 Sheets-Sheet 1

Inventor:
B. J. Allen,

April 5, 1938.  B. J. ALLEN  2,113,071
STABILIZER FOR VEHICLES
Filed Jan. 6, 1936  3 Sheets-Sheet 3

Inventor.
B. J. Allen,
By
Attorneys

Patented Apr. 5, 1938

2,113,071

UNITED STATES PATENT OFFICE 2,113,071

STABILIZER FOR VEHICLES

Bernard James Allen, Blythe Bridge, England

Application January 6, 1936, Serial No. 57,853
In Great Britain July 18, 1935

23 Claims. (Cl. 267—15)

This invention relates to wheeled vehicles supported upon at least two wheels disposed at opposite sides respectively of the vehicle. The invention relates more particularly to motor cars, motor lorries and similar road vehicles. It also relates to aeroplanes fitted with landing wheels spaced from one another laterally of the fuselage of the plane.

The object of the invention is to provide an improved construction of stabilizing device for vehicles of the above description, which, while being operative to equalize at all times the load upon the two wheels at the two sides respectively of the vehicle and thereby keep both of these wheels, or in the case of a four-wheeled vehicle, all four of the wheels, in even and proper contact with the ground as the vehicle rides over rises in the road surface or into depressions or dips therein or as the vehicle rounds a corner at speed, thereby reducing the tendency for inequality of wear to take place of the tyres of the wheels on the two sides of the vehicle and in the case of a vehicle turning the corner, the tendency for the wheels to slip sideways and produce skidding of the vehicle, and at the same time to assist or cause the vehicle to maintain a level position as it rides over the rises or down into the depressions or dips in the road surface, shall be so operative with maintenance at all times to each of the wheels on the two sides respectively of the vehicle of independent springing, that is, for the absorption of shock from the road surface when one or other of the wheels encounters a bump therein or, say, rides over a pothole, in contrast to the case where the shock from this cause is transferred through the stabilizing device to the opposite wheel and is absorbed in a shock absorbing element which is common to both wheels.

With the foregoing object in view, the invention comprises in a vehicle having at least two wheels disposed at opposite sides respectively of the vehicle, the combination of a chassis frame, an axle means for one of the wheels, at one side of the vehicle, an axle means for the other wheel, at the other side thereof, and a load-taking intermediary in operative interposition between the chassis frame and the two axle means for the transference to the latter from the chassis frame of a part at least of the total vehicle weight to be borne by the axle means and also between the two axle means themselves for the transmission of axle load thrust from the one axle means to the other whereby the opposed thrust from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced.

A vehicle fitted with the improved stabilizing means according to the invention as set forth in the preceding paragraph, should ride over undulating ground with consequent lift of the wheel at one side relatively to the chassis of the vehicle, the said lift of the wheel will be accompanied by a lift of the chassis which in turn will occasion a temporary lessening of the axle load thrust in the thrust connection of the load-taking intermediary on the side of the vehicle remote from that at which the wheel is situated which has ridden up on to the rise in the road surface, and the lessening of the said axle load thrust will result in release of the clutch means of the intermediary and a shifting therefore of the abutment and of the two thrust connections on either side thereof to a new position in relation to the chassis of the vehicle at which the balance of axle load thrust as between the two connections is re-established and in consequence the clutch means re-assumes its locked condition and the abutment its active or effective condition as an abutment towards the two thrust connections on either side of it and therefore, through these connections, towards the two wheels at either side of the vehicle in the new positions which these wheels have now assumed in relation to the chassis frame. In other words, in the new positions of the wheels the resilience elements of the thrust connections are both in their original or maximum predetermined condition as regards capacity for the absorption of shock, that is, are neither in a supernormal tensioned condition, so as to be undesirably stiff or unyielding towards the shock received in the element, nor in a subnormal tensioned condition, so as to be soft or too yielding for the efficient absorption of shock, and this obtains even in the event of both of the wheels on the two sides respectively of the vehicle encountering a bump or riding over a hole in the road surface simultaneously, each thrust connection taking care, as will be appreciated, of the shock received in it from its own wheel. In the result, a maximum of comfort is assured to the occupants of the vehicle and a minimization of transmission of distorting and other strains to the chassis frame and connected parts of the vehicle.

The foregoing action of the improved stabilizing means according to the invention is applicable also to the case where the vehicle fitted with the means is turning a sharp corner at high speed. In such case, the clutch means will automatically become unlocked so as to release the abutment and permit it together with the thrust connection on either side of it to shift to the new position in relation to the chassis of the vehicle at which the road pressures upon the wheels are again equalized, by reason of the lessening of axle load thrust which will take place in the thrust connection of the load-taking intermediary at the side of the vehicle towards the inside of the curve the vehicle is turning, and of the simultaneous accession of axle load thrust in the other thrust connection of the intermediary. Although, therefore, the body of the vehicle may tilt somewhat as the vehicle is turning the corner, all four wheels of the vehicle are nevertheless preserved in even and proper contact with the ground and in consequence the tendency for side slip is minimized and wear and tear of the tires of the wheels is reduced. In addition, equally as in the case where the vehicle is travelling along a straight course, if one or more of the wheels of the vehicle should strike a bump, or meet some other form of pronounced irregularity in the road surface, the full shock absorbing capacity of the spring suspension for the wheel or wheels is immediately available to take up the shock with maximum or optimum efficiency of absorption thereof.

The vehicle, moreover, will tend to maintain its lateral level at all times as the wheel at one side rises or approaches the chassis of the vehicle and the opposite side recedes therefrom, simply rising level or parallel to itself during the adjustment of the relative vertical positions of the two wheels. In this connection, it will be realized, of course, that the constraint upon the chassis frame to keep level at the forward end as it lifts with the rise at one side and the fall at the other of the road wheels of the vehicle, will be derived partly from the rear end of the vehicle on account of the rigidity of the chassis frame and partly from the inertia of the body and chassis of the vehicle.

According to a feature of the invention, however, the vehicle, in the case of a four-wheeled vehicle, for example, a motor car, lorry or the like, may be fitted with two sets of stabilizing means according to the invention, one set in relation to the front wheels of the vehicle and the other set in relation to the rear wheels thereof; in which event, as the front wheels are adjusting their relative positions in relation to the chassis of the vehicle, the load-taking intermediary of the rear wheels is in locked condition and in consequence the reaction from the intermediary of the rear wheels is available through the chassis of the vehicle to add its quota to the constraint upon the front end of the chassis to keep level, and this action is repeated from the forward end of the vehicle towards the rear end thereof, when the rear wheels in turn meet the rise or depression in the road surface.

The invention is applicable both to the case where the two wheels at the opposite sides respectively of the vehicle are mounted upon opposite ends of an axle (for example, an articulated axle) extending completely across the width of the vehicle, and also to the case where the two wheels are independently suspended upon separate axles, and the expression "axle means" as used herein is to be understood accordingly as including both the case where the axle means is constituted by one end of an axle which is common to the two wheels at either side respectively of the vehicle and also the alternative case where the two wheels are mounted upon separate axles. In the latter case, the wheel axles on the two sides of the vehicle are preferably so mounted as to be movable, relatively to the chassis frame, rectilinearly only, as the wheel at one side rises and falls relatively to the other.

Various other features of novelty characterize the invention, as will appear from the following more detailed description thereof, and as will be severally claimed in the concluding statement of claim.

The accompanying drawings illustrate several embodiments of the invention by way of example. In the drawings:—

Like reference characters indicate like parts in the various figures.

Figures 1, 2, 3, 6, 7, 8:
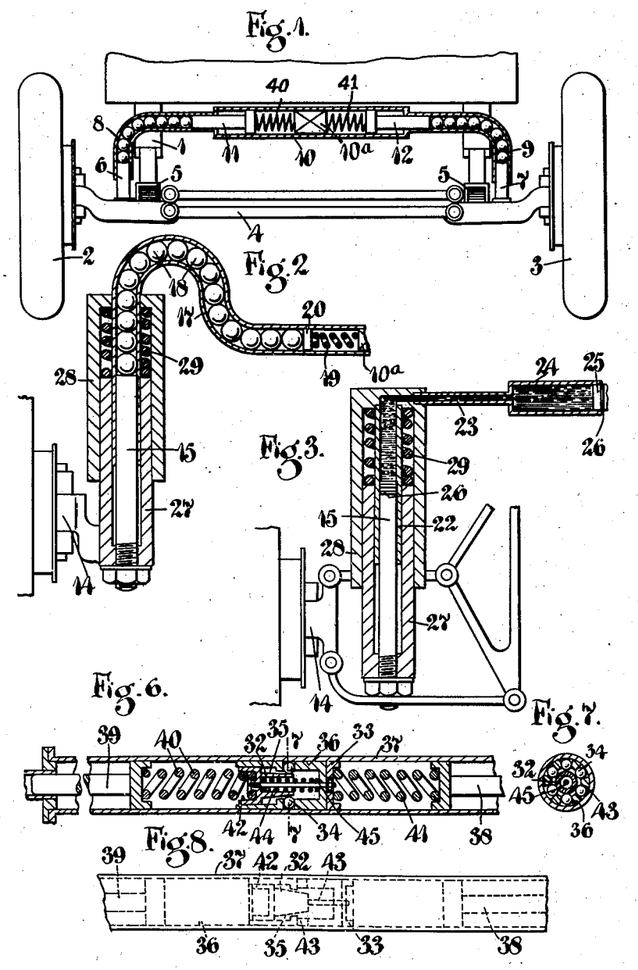
Figure 1 shows one form of the invention as applied to the case where the two wheels on opposite sides of the vehicle are mounted upon an articulated axle common to them both and extending completely across the width of the vehicle, the axle taking a part of the weight of the vehicle through the intermediary of elliptical, semi-elliptical or other type of chassis springs and the balance of the weight of the vehicle being transmitted to the wheel axle in equally distributed portions at the two ends thereof through the intermediary of the load-taking intermediary of the stabilizing means of the invention.
Figure 2 shows a form of the invention as applied to the case where the wheels at the two sides of the vehicle are independently suspended, each having their own axle.
Figure 3 shows another form as applied to the same case.
Figures 6, 7 and 8 are a longitudinal section, a transverse section on the line 7—7 of Figure 6, and a plan view respectively, of a preferred form of locking means for locking the load-taking intermediary of the stabilizing means against shifting movement when the axle loads are balanced at the two ends respectively of the intermediary.

In Figure 1, the longitudinal side girders of the chassis frame of the vehicle are marked 1, the two wheels at the two sides respectively of the vehicle, 2, 3, the articulated axle of these wheels 4 and the chassis springs referred to 5. The axle load equalizing device in this form of the invention comprises a pair of plungers 6, 7, suitably affixed to the axle 4 and projecting vertically upwards therefrom into the downwardly directed ends of two tubes 8, 9 mounted in fixed relation to the chassis and body of the vehicle and accommodating ball bearings as shown. These ball bearings constitute the linear thrust intermediaries hereinafter referred to. The tubes 8, 9 are bent over into a horizontal direction as to their upper part and at their inner ends are connected by an intermediate tube 10 housing the locking device which locks the load-taking intermediary against shifting movement when the axle load thrusts from the two ends respectively of the intermediary are balanced, and also the resilience elements of the intermediary.

The locking device is illustrated, as regards the details of its construction, in Figures 6, 7 and 8, and in Figure 1 it is simply shown diagrammatically, being represented by the part marked 10a.

Intervening between the ball bearings in the tubes 8, 9 and the locking device 10a are a pair of plungers 11, 12 which are displaceable along the tube 10 with the locking device in the shifting movement of the intermediary.

As the vehicle travels along the road, the plungers 6, 7 rise and fall in the lower end of the tubes 8, 9 with relative rising and falling of the vehicle wheels 2, 3 (that is in relation to the level of the chassis frame) and with this rising and falling movement of the plungers 6, 7, the intervening series of ball bearings in the tubes 8, 9, the locking device 10a and the springs, hereinafter more particularly described, constituting the resilience elements of the intermediary move together in the one direction or the other along the tubes 8, 9 and 10, said springs serving to absorb shock which would otherwise be transmitted from the wheel axle to the chassis frame of the vehicle. The tubes 8, 9 and 10 are preferably packed with grease or a like lubricant.

The locking device 10a will now be described. As shown, in the said Figures 6, 7 and 8, this device is constituted in effect by a double acting ratchet or clutch. The clutch comprises a cone-shaped clutch member 32 slidable in a cylindrical housing 33 which also houses a ring of balls 34 operatively intervening between the taper surface 35 of the clutch member 32 and the opposed cylindrical inner surface 36 of a tube 37 surrounding the housing 33. This tube 37 is the tube 10 of Figure 1 and the assemblage comprising the clutch member 32, the housing 33 and the ring of balls 34 is slidable along it.

The said assemblage of parts 32, 33 and 34 is arranged to support oppositely directed axle load thrust transmitted from the wheel axles at the two sides of the vehicle respectively, through the intermediary of the lines of ball bearings in the tubes 8, 9, two plungers 38, 39 corresponding respectively to the two plungers 11, 12 of Figure 1 and a pair of compression springs 40, 41 constituting the resilience elements hereinbefore referred to, of the load-taking intermediary, the said lines of ball bearings, the two plungers referred to and the two compression springs constituting together the two thrust connections hereinbefore referred to of the intermediary.

The spring 40 is interposed between the plunger 39 and the back of the clutch member 32, being received at the right hand end within a recess 42 in the clutch member, and the other spring 41 is interposed between the plunger 38 and the housing 33, being received at the left hand end in a cup-like recess therein.

In the operation of the clutch, the ring of balls 34, which as shown are accommodated each in a hole 43 in the peripheral wall of the housing 33, are arranged to be forced into locking engagement with the taper surface 35 and the cooperating wedging surface 36 by engagement with the abutment surface constituted by the right hand side of the hole 43, whenever the axle load thrusts on the two sides of the clutch are substantially balanced. As soon as one of these thrusts lessens, that is to a value below the normal, and in consequence the locking pressure upon the balls exercised by the abutment surfaces at the right hand side of the holes 43 is relieved, the balls no longer operate to prevent movement of the member 32 and the housing 33 along the tube 37, with the result that the load-taking intermediary, constituted by the plungers 6, 7, the balls in the tubes 8, 9, the plungers 38, 39, the compression springs 40, 41 and the clutch, becomes unlocked for shifting movement in the one direction or the other until the axle load thrusts on the two sides of the clutch have again become equal or balanced, whereupon the clutch again engages to lock the intermediary in the new position of the road wheels.

In order to ensure the above action of the clutch, involving its immediate release upon a lessening taking place of the thrust exercised upon it from one of the thrust connections, there is interposed between the clutch member 32 and the housing 33 a compression spring 44 which nearly balances the two springs 40, 41 (that is, in the vehicle-loaded condition of the springs) so as in effect to share the axle load thrust obtaining in the intermediary immediately the clutch unlocks. The effect of the spring 44 is also to ensure the more positive separation of the member 32 and housing 33 with the consequent unlocking of the balls. The left hand side of the holes 43 is so positioned in the housing that this side of the holes constitutes a second abutment surface relatively to the balls, operative positively to disengage the balls from the taper wedging surface 35 whenever the member 32 moves in the direction away from the right hand end of the housing.

The spring 44 surrounds a bolt 45 rigidly mounted at one end in the member 32 and extending loosely at the other end through the right hand end of the housing 33. The purpose of this bolt is partly to couple the two parts 32, 33 for movement together in either direction along the tube 37, upon relative separating movement of the parts having taken place to the predetermined extent provided for by the clearance between the head of the bolt 45 and the opposed face of the housing and partly to predetermine and accurately set the degree of compression of the spring 44 to give the proper action of the clutch, that is, to ensure that whilst normally it shall be truly in a locked, if only a lightly locked, condition, so long as the opposed axle load thrusts upon it are equal or balanced, the rigidity with which it is locked, however, increasing with increase of axle load thrust from one side of the clutch unaccompanied by lessening of thrust to a value below the normal from the other side (due, for example and as hereinafter described, to lift of the vehicle chassis), it shall nevertheless be operative to unlock and thereby release the two thrust connections for shifting movement along the tubes 8, 9, 37 immediately a lessening of thrust occurs on one side or the other of the clutch.

It will be appreciated that the strength of the various springs 40, 41 and 44 will be predetermined with regard to the general dimensions and weight of the vehicle and with respect also to the strength of the chassis springs 5.

In order that the clutch shall be operative irrespective of the position of its parts 32, 33, 34 along the tube 37, the wedging surface 36 thereof is of truly cylindrical form and its cylindrical axis is coincident both with the axis of the recess 42 and also with the axis of the wedging surface 35.

The constructional details of the clutch may be varied considerably without departure from the general function and principle of operation of the clutch. For example, the taper wedging surface 35 may if desired be a flat surface instead of one of conical form. Also, rollers may be employed in place of the balls 34. Again, it is not essential that the thrust reaction tube 37 shall be cylindrical; it may be of any other desired cross-section, for example, square, provided that at all times the path of movement of the wedging surface 35 is parallel to the co-operating surface 36 of the tube. The operation of the device is as follows: Assuming the vehicle is travelling along a perfectly level road, all four wheels will be at the same vertical distance below the level of the chassis frame, which it will be further assumed is also level. The axle load will also be approximately equally distributed between each pair of wheels and in consequence the load-taking intermediary will be locked by the clutch against otherwise free shifting movement. As soon as one of the wheels, however, say the front near side wheel of the vehicle, either rides up on to a rise in the road surface or rides down into a depression or dip therein, a relief of the axle load pressure at one side of the clutch will take place (due in the case of a rise to the lift of the vehicle) and in consequence, an unbalanced condition will be established as between the opposite axle load thrusts from the two ends respectively of the intermediary, with the result that the clutch will automatically disengage and release the intermediary and through it the two front wheels of the vehicle, for adjustment of position relatively to the chassis frame in accommodation of the altered relative levels on the two sides of the vehicle respectively of the road surface. As soon as this adjustment has taken place, and in consequence the load pressures upon the two axles or axle ends at the two sides of the vehicle respectively have again become equal, the clutch will automatically come into operation again to relock the intermediary against further shifting movement and consequently the two wheels of the vehicle in their adjusted relative positions in relation to the level of the chassis frame and therefore to re-establish the clutch in the function it normally fills of an abutment towards the two thrust connections of the intermediary, until the wheels encounter a further irregularity in the road surface whereupon a re-adjustment in their relative levels will take place in the same manner as that just described.

In the normal case contemplated above, of a vehicle fitted with a stabilizing device according to the invention at each end, the chassis frame and consequently the body of the vehicle will be helped to remain level during the above adjustment of the relative levels of the wheels as the vehicle passes over irregularities in the road surface. Thus, while the front wheels of the vehicle are performing their adjustment of relative level under the action of the stabilizing device of the front wheels, the load-taking intermediary of the stabilizing device of the rear wheels is in locked condition (since these wheels have not yet met the obstruction or irregularity which is occasioning the adjustment of relative level of the front wheels) and in consequence the rear wheel axle or axles tend to impose a constraint upon the vehicle chassis to maintain it level during the rise at one side and fall at the other of the front wheels of the vehicle; conversely, this action is repeated as from front to rear of the vehicle upon the rear wheels meeting the same irregularity in the road surface and consequently being caused to perform a corresponding adjustment of relative axle levels to accommodate the irregularity.

Referring next to Figures 2 and 3, the axle of the independently suspended wheel at one side of the vehicle is marked 14, and the stabilizing device comprises a plunger 15 corresponding to the plunger 6 or 7 of the form of the invention illustrated in Figure 1, and a tube 17 and a line of ball bearings 18 corresponding respectively to the tube 8 or 9 and the line of ball bearings therein of the said form of the invention of Figure 1. Within the tube 17 is a compression spring 19 corresponding to the spring 40 or 41 of the form of the invention shown in Figure 1 and a plunger 20 corresponding to the plunger 11 of that figure, it being understood, of course, that these parts, appearing in Figure 2 to the left of the locking device 10a, are duplicated on the other side of the vehicle.

As will be seen, the principal difference between the form of the invention shown in Figure 2 and that shown in Figure 3 is that whereas in the form shown in Figure 2, the thrust connections leading from the locking device 10a to the respective axle ends comprise lines of ball bearings 18, in the form of the invention shown in Figure 3, the said connections are constituted by linear bodies of a fluid, for example, oil. Thus the plunger 15 works as a fluid-tight piston in a cylinder 22 communicating through a pipe line 23 with a similar cylinder 24 in which works a piston 25, this piston 25 constituting the equivalent part in this form of the invention to the part 20 of the form illustrated in Figure 2, and the cylinder 24 the equivalent of the tube 10 of Figure 1 and the corresponding tube 37 of Figures 6, 7 and 8.

Both in the form of the invention shown in Figure 2 and in that shown in Figure 3, the plunger 15 extends axially through the interior of a surrounding sleeve 27 vertically disposed and suitably connected to the wheel axle 14 so as to be capable of rising and falling with it relatively to the chassis frame of the vehicle. In the construction shown in Figure 2, the sleeve 27 is directly connected to the axles. In the construction of Figure 3, it is connected indirectly, through the intermediary of one of the horizontal radius links of the axle suspension. The sleeve 27 is telescopable within a second sleeve 28 also vertically disposed but rigidly connected to the chassis frame, from which, therefore, it depends with a vertical sliding fit over the upper part of sleeve 27. As the wheel upon the axle 14 rises or falls relatively to the level of the chassis frame, sleeve 27 rises or falls correspondingly in sleeve 28, which remains, of course, in stationary relation to the chassis frame, and at the same time plunger 15 rises or falls in the lower or depending portion of tube 17, with consequent translation of the series of ball bearings 18 and with these the locking device and the associated compression springs bodily along said tube 17.

Similar action takes place in the case of the form of the invention shown in Figure 3, piston 15 rising or falling in cylinder 22 with consequent and simultaneous translation of piston 25 in cylinder 24 and the oil or other intervening fluid medium in pipe line 23.

It will be appreciated of course, that the position in the vehicle of the tube 17 of ball bearings, or in the Figure 3 form of the invention, the pipe line 23 is quite immaterial to the principle and mode of functioning of the stabilizing device, and this is a feature of advantage of the invention, inasmuch as it enables the said parts of the device extending between the plungers 15 to be located at any desired position in the vehicle, according for example to convenience or the general design of the vehicle.

In the forms of the invention illustrated in these Figures 2 and 3, only a part of the load of the vehicle is transmitted to the wheel axles through the intermediary of the stabilizing device. The balance is transmitted through compression springs 29 interposed in the annular space between the inner end of sleeve 27 and the top or inner end of sleeve 28, the strength of these springs 29 being chosen as before, according to the general dimensions, weight and normal loading conditions of the vehicle.

Figures 4, 5, 10:
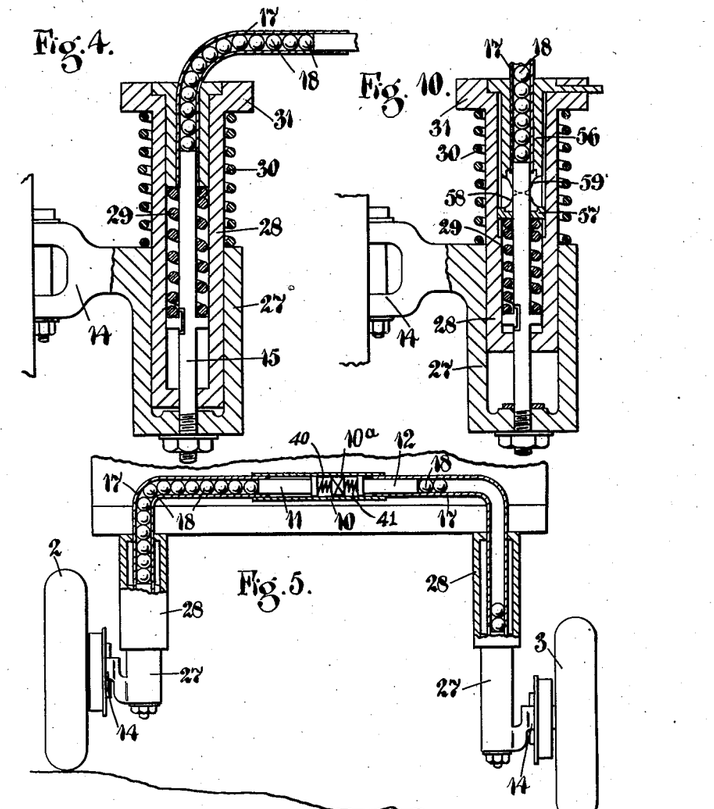
Figure 4 shows another form still.
Figure 5 is a somewhat more diagrammatic view showing how in the operation of the stabilizing means of the invention, the wheel at one side rises relatively to the chassis frame while the wheel at the other side falls, the chassis frame remaining, however, substantially level.
Figure 10 shows a form of means for similarly varying the strength of the chassis springs which operate to transmit part of the chassis load to the wheel axle directly.

Referring to Figure 4, the construction shown in this figure is generally similar to that shown in Figure 2, one essential difference being that sleeve 28 telescopes into sleeve 27 whereas in the form of the invention shown in Figure 2, the reverse is the case, sleeve 27 telescoping into sleeve 28. Another difference is that another direct load transmitting spring 30 is provided additional to the spring 29, this other spring 30 being interposed as shown between the upper or outer end of sleeve 27 and a flange 31 upon the upper end of sleeve 28. If desired, however, one of these springs 29 or 30 may be omitted or any other desired or convenient arrangement of direct load transmitting springs may be employed than either of those shown, according again to circumstances, for instance the general design, dimensions or conditions of loading or travel of the vehicle.

On very heavy vehicles, the wheel axle at each side of the vehicle may if desired be supported upon two separate supports each constituted by parts such as the parts 27, 28, 29, 30, and each communicating for the transmission and equalization of axle load thrust with the corresponding supports at the other side of the vehicle, either through the intermediary of separate thrust lines or through the intermediary of a common thrust line branched at the ends with branches leading respectively from the two supports.

Figure 9:
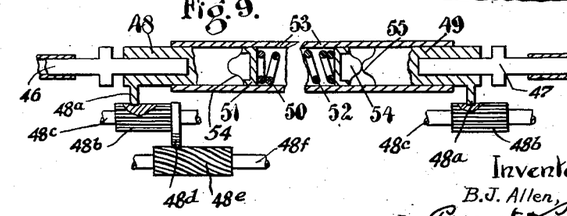
Figure 9 illustrates by way of example a simple form of means for varying the strength of the springs constituting the resilience elements of the thrust connections of the load-taking intermediary.

Referring now to Figure 9, it is to be understood that this figure is largely diagrammatic and is intended to illustrate the principle of the invention rather than a detailed constructional embodiment. 46, 47 are two parts corresponding to the plunger ends 11, 12 of Figure 1. Intervening between these parts 46, 47 are two additional plunger parts 48, 49, a pair of compression springs 50, 50a corresponding to the springs 40, 41 of Figure 1, a locking device (not shown) corresponding to the locking device 10a of Figure 1 and two plunger cups 51, 52 interposed between the ends of the springs 50, 50a and the adjacent ends of the plunger parts 48, 49. All of the parts referred to 48, 49, 50, 51, 52 are movable bodily or together along a tube 53 corresponding to tube 10 of Figure 1, that is to say with the shifting movement of the load-taking intermediary of the stabilizing device of the invention. The cups 51, 52 are non-rotatively slidable along the tube 53, being restrained against rotation by, for example, keyed engagement with the tube 53. Each cup 51, 52 carries upon the edge of its mouth a cam surface 54 arranged to cooperate with a corresponding cam surface 55 carried upon the adjacent end of the corresponding plunger 48, or 49, these plungers being not only slidable along tube 53 but rotatable therein so as by rotation against the reaction from the rear of the parts 46, 47 to move towards or away from one another (according to the direction of rotation of the plunger part) the cups 51, 52 and in consequence adjust the condition of compression and therefore the operative thrust of the springs 50, 50a.

Such adjustment of the springs 50, 50a has the effect, as will be appreciated, of stiffening or slackening the spring suspension of the road wheels. The adjustment may be effected either at will, for example by a manual control upon the dashboard of the vehicle operatively connected to the rotatable plunger parts 48, 49 for simultaneous partial rotation thereof in opposite directions (the cams 54, 55 being suitably arranged in oppositely acting relationship for this purpose), or automatically whenever the vehicle turns a corner or otherwise moves from a rectilinear path. In the latter case, an interconnection would be provided as between the rotatable plunger parts 48, 49 and a movable part of the steering gear of the vehicle, for example the track rod or the steering column, so that whenever the steering gear is operated to turn the vehicle one way or the other the springs 50, 50a are compressed to stiffen the spring suspension of the wheel axles. In the embodiment of the invention shown, the plunger parts 48, 49 each carry a toothed quadrant 48a meshing at the periphery with a long pinion 48b. These pinions 48b are fast upon a rotatable shaft 48c carrying a quadrant 48d. The quadrant 48d meshes at the periphery with a spirally toothed member 48e fast upon the track rod 48f of the steering gear of the vehicle, the arrangement being such that as this rod is moved to and fro in the operation of the steering gear the spirally toothed member 46e effects a partial rotation of the quadrant 48d and therefore of the shaft 48c and the pinions 48b thereon, with the result that the quadrants 48a are also given a partial rotation to rotate the plunger parts 48, 49. It is necessary to interpose the long pinions 48b as will be appreciated, in view of the fact that the plunger parts 48, 49 are movable as described above along the tube 53 in the shifting movement of the load-taking intermediary of the device.

Referring to Figure 10, this figure shows an arrangement in which the spring 29 of Figure 4 is compressed or relaxed as required to stiffen or slacken the spring suspension of the wheel axle, either in place of the similar adjustment of the springs 50, 50a in the arrangement as described above or in addition thereto. Thus, there is interposed between the upper end of spring 29 and the lower or inner end of a rotatable sleeve 56 in the upper part of sleeve 28 a cup 57 similar to the cups 51, 52 of Figure 9, this cup 57 carrying a cam 58 co-operating with an opposed cam 59 on said inner end of sleeve 56, which latter is rotatable in the sleeve 28, either by manual adjustment or automatically by an interconnection with the steering gear as described above, to displace the cup 57 upwardly or downwardly along the bore of sleeve 28 and thereby stiffen or slacken, as the case may be, the compression spring 29.

In the event of the adjustment of the operative compression of the various springs referred to being effected by a manual control say from the dashboard of the vehicle, the arrangement provided is one, as will be appreciated, enabling the springing of the wheels of the vehicle to be stiffened as required to provide for suitable suspension when travelling over rough roads at speed or carrying heavy loads.

Figure 11:
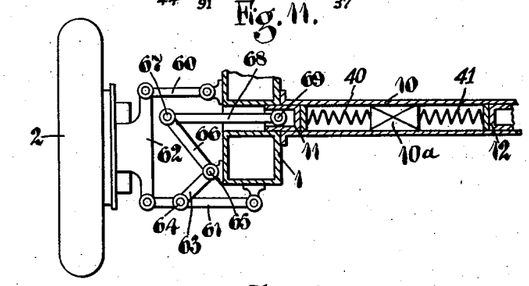
Figure 11 shows a modified arrangement in the case where the wheels at the two sides of the vehicle are independently suspended, each having its own axle and the whole of the axle load being supported by the stabilizing means of the invention.

Referring now to the arrangement illustrated in Figure 11, the stabilizing device of the invention according to this modified form thereof, comprises, as in the arrangement of Figure 1, two plungers 11, 12 slidable along a tube 10 and separated by a pair of compression springs 40, 41 and an intervening locking device 10a of the construction above described. These springs 40, 41 are arranged to provide for the whole of the resilience in the mounting of the road wheels of the vehicle, in contrast to the arrangement illustrated in Figure 1 wherein, as described, a part of the load of the vehicle is taken by chassis springs 5 (see Figure 1). The axle load thrust is transmitted at each side of the vehicle to the plunger 11 (or 12 as the case may be) through the intermediary of a system of links operatively connecting the axle of the vehicle wheel on the one hand with the chassis frame 1 of the vehicle and on the other with the said plunger 11 (or 12). The system of links comprises two horizontal radius links 60, 61 pivoted at their inner ends to the chassis frame 1 and at their outer ends to the upper and lower ends respectively of a bracket 62 carrying the wheel axle. Also pivoted to the chassis frame 1 is a bell crank lever, the lower arm 63 of which has a sliding pivotal connection at 64 with the lower radius link 61. The bell crank lever, which is pivoted at 65 to the chassis frame 1, has its other arm 66 pivotally connected at 67 to the outer end of a horizontal push rod 68, the inner end of which is pivoted at 69 to the plunger 11 (or 12). If desired the bell crank lever 63, 66 may be articulated to the upper radius link 60 instead of to the lower one.

According to the arrangement illustrated in Figure 12, a part of the axle load is taken, as above described, by chassis springs as in the arrangement described with reference to Figure 1. Thus, at each side of the vehicle there is a laterally extending leaf spring 70 suitably affixed to the chassis frame and pivotally connected at its outer extremity 71 to the upper end of a bracket 62 similar to the bracket 62 of Figure 11. To the lower end of this bracket 62 is pivotally connected the outer end of a horizontal radius link 73 similar to the link 61 of the arrangement of Figure 11 and pivotally connected at its inner end 74 to a bracket 75, in turn rigidly mounted upon the underside of the chassis frame 1 of the vehicle. As, relatively to said chassis frame, the vehicle wheel 3 rises and falls, the link 73 will correspondingly turn about the axis 74 of its pivotal connection to the bracket 75, with consequent rise or fall of the plunger 7 in the tube 9 of the stabilizing device of the invention (which, as will be observed, is similar in this form of the invention to that in the form illustrated in Figure 1), the said plunger 7 being pivotally connected at the bottom to the link 73.

Figure 12:
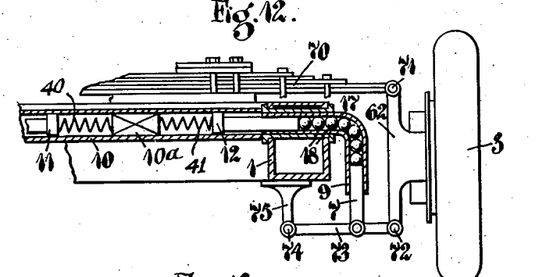
Figure 12 shows a modified arrangement, but in the case where a part only of the axle load is supported by the stabilizing means, the balance being taken by chassis springs.
Figure 13:
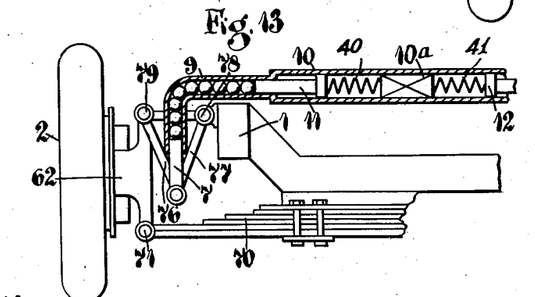
Figure 13 shows a further modified arrangement, also in the case where part of the axle load is taken by chassis springs.

The arrangement illustrated in Figure 13, is generally similar to that illustrated in Figure 12, with the exception that the chassis spring 70 is located below the chassis frame 1 and the plunger 7 is pivotally connected to the lower ends of a pair of links 76, 77 which depend respectively from the upper end of the axle bracket 62 and a pivotal mounting 78 upon the chassis frame 1, there being a horizontal radius link 79 pivotally connected at the outer end to said upper end of the axle bracket 62 and at the inner end to said pivotal mounting 78. With this arrangement, as in the arrangement described with reference to Figure 12, as the vehicle wheel rises and falls relatively to the chassis frame 1, the plunger 7 rises and falls in the tube 9, with consequent transmission of axle load thrust to the opposite side of the vehicle through the intermediary of the thrust connections comprising the lines of balls in the tubes 8, 9, the two plungers 11, 12 and the intervening compression springs 40, 41 and locking device 10a.

In the arrangements illustrated in Figures 11 and 12, the tube 10 along which the parts 11, 12, 40, 41 and 10a are displaceable, is incorporated in the chassis frame as a cross member thereof. This arrangement is advantageous on account of the fact that during the locked condition of the clutch between the oppositely acting thrust connections, the tube 10 is in effect a thrust reaction member of the clutch and therefore by incorporating it in the chassis frame the reaction forces sustained in it may be readily distributed.

In the event of an oil medium being used in the thrust connections, any leakage of oil there may be past the plungers 15 (Figure 3) may be arranged to be replaced from a spring-loaded container or containers fitted with a non-return valve.

Moreover, the oil column above the piston 15 (Figure 3) may if desired communicate with a dashpot acting as a damper or additional damper or shock absorber in the thrust line.

It may be remarked that an important advantage of the invention additional to that already remarked, of each of the compression springs 40, 41 of the two wheels respectively at the two sides of the vehicle being at all times, irrespective of the relative vertical positions of the wheels, in optimum shock-absorbing condition, is that the effect which is frequently experienced with spring axle suspensions of "juddering" is largely if not entirely eliminated with consequent improvement in the riding of the vehicle.

Figure 14:
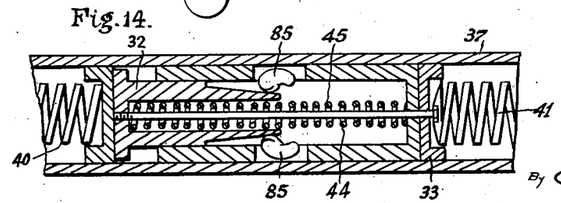
Figures 14 and 15 illustrate alternative forms of the locking means to that shown in Figures 6, 7 and 8.
Figure 15:
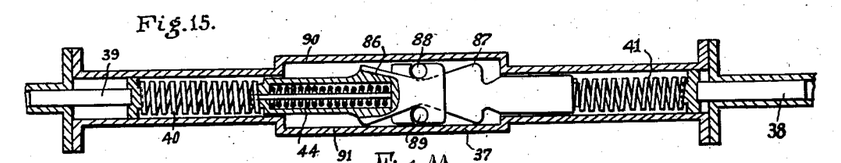

It will be obvious to engineers in the art that the invention is susceptible to considerable variation as regards constructional details; for example, instead of employing the particular form of double-acting clutch hereinbefore described with reference to Figures 6, 7 and 8 of the drawings, any other suitable form of clutch may be employed. Figure 14 illustrates for instance an arrangement in which the active elements which become wedged between the reaction surfaces take the form of pawls 85. Figure 15 illustrates another arrangement in which the clutch comprises in effect a double-action ratchet consisting of two oppositely acting wedge-shaped clutch members 86, 87 co-operating with a pair of clutch rollers 88, 89 interposed between them and stationary wedging surfaces 90, 91 along which, in the direction of length thereof, the assemblage of clutch members and rollers is displaceable with the rise at one side and fall at the other of the two wheels on either side respectively of the vehicle.

What I claim and desire to secure by Letters Patent of the United States is:—

1. In a vehicle having at least two wheels disposed at opposite sides respectively of the vehicle, the combination of a chassis frame, an axle means for one of the wheels, at one side of the vehicle, an axle means for the other wheel, at the other side thereof, and a load-taking intermediary in operative interposition between the chassis frame and the two axle means for the transference to the latter from the chassis frame of a part at least of the total vehicle weight to be borne by the axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced.

2. In a vehicle, the combination specified in claim 1, in a form wherein the thrust connections comprise linear thrust intermediaries, portions of which travel along a non-rectilinear path in the shock absorbing movement of the connections and in their displacement with the shifting of the abutment, and the said intermediaries, at least as regards the said portions thereof which travel along a non-rectilinear path, consist of a line of anti-friction rolling elements guided to move along the said path.

3. In a vehicle, the combination specified in claim 1, in a form wherein the thrust connections comprise linear thrust intermediaries, portions of which travel along a non-rectilinear path in the shock absorbing movement of the connections and in their displacement with the shifting of the abutment, and the said intermediaries, at least as regards the said portions thereof which travel along a non-rectilinear path, consist of a linear body of fluid contained and guided in an enclosing conduit.

4. In a vehicle, the combination specified in claim 1, in a form wherein the thrust connections comprise linear thrust intermediaries, of which a section is elastic and consists of a spring, and another section is inelastic and includes a portion which travels along a non-rectilinear path in the shock absorbing movement of the intermediary and in the displacement thereof with the shifting of the abutment, and consists of a line of anti-friction rolling elements guided to move along the said path.

5. In a vehicle, the combination specified in claim 1, in a form wherein the thrust connections comprise linear thrust intermediaries, of which a section is elastic and consists of a spring, and another section is inelastic and includes a portion which travels along a non-rectilinear path in the shock absorbing movement of the intermediary and in the displacement thereof with the shifting of the abutment, and consists of a linear body of fluid contained and guided in an enclosing conduit.

6. In a vehicle having at least two wheels disposed at opposite sides respectively of the vehicle, the combination of a chassis frame, an axle means for one of the wheels, at one side of the vehicle, an axle means for the other wheel, at the other side thereof, and a load-taking intermediary in operative interposition between the chassis frame and the two axle means for the transference to the latter from the chassis frame of a part at least of the total vehicle weight to be borne by the axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating a double-acting clutch means automatically operative to lock the abutment in any position in the path of shift thereof when the opposed thrusts in the thrust connections are substantially balanced, the clutch being ineffective and operative to release the abutment for shifting movement to a new position in its path at which the thrusts from the connections are again balanced, whenever the thrust in one of the connections falls below normal and in consequence the opposed thrusts in the connections become unbalanced.

7. In a vehicle, the combination specified in claim 6, in a form wherein the clutch means comprises two members which are movable towards and away from one another along a stationary wedging surface between which and an opposed wedging surface on one of the said members is interposed at least one jamming element which is arranged to be thrust into locking engagement with the two wedging surfaces by an abutment surface provided for this purpose upon the other of the said members, and spring means urging the clutch members in the direction away from one another, the arrangement being such that under the normal conditions of loading of the vehicle and with the opposed axle load thrusts on the two sides of the clutch balanced and each at least equal to the normal thrust to obtain in the connections, the clutch means is in locked condition, while upon lessening of the thrust in one or other of the connections to a magnitude below the normal, the spring means becomes operative to separate the clutch members and thereby to release the clutch means to permit it to shift with the abutment and the thrust connections to the new position at which the thrusts are again balanced.

8. In a vehicle, the combination specified in claim 6, in a form wherein the clutch means comprises two members which are movable towards and away from one another along a stationary wedging surface between which and an opposed wedging surface on one of the said members is interposed at least one jamming element which is arranged to be thrust into locking engagement with the two wedging surfaces by an abutment surface provided for this purpose upon the other of the said members, and spring means urging the clutch members in the direction away from one another, the arrangement being such that under the normal conditions of loading of the vehicle and with the opposed axle load thrusts on the two sides of the clutch balanced and each at least equal to the normal thrust to obtain in the connections, the clutch means is in locked condition, while upon lessening of the thrust in one or other of the connections to a magnitude below the normal, the spring means becomes operative to separate the clutch members and thereby to release the clutch means to permit it to shift with the abutment and the thrust connections to the new position at which the thrusts are again balanced, and a second abutment surface being provided in the said other of the clutch members for effecting positive disengagement of the jamming element from the wedging surfaces consequent upon the separation of the clutch members.

9. In a vehicle, the combination specified in claim 6, in a form wherein the clutch means comprises two members which are movable towards and away from one another along a stationary wedging surface carried upon a member incorporated in the chassis frame, between which wedging surface and an opposed wedging surface on one of the said members is interposed at least one jamming element which is arranged to be thrust into locking engagement with the two wedging surfaces by an abutment surface provided for this purpose upon the other of the said members, and spring means urging the clutch members in the direction away from one another, the arrangement being such that under the normal conditions of loading of the vehicle and with the opposed axle load thrusts on the two sides of the clutch balanced and each at least equal to the normal thrust to obtain in the connections, the clutch means is in locked condition, while upon lessening of the thrust in one or other of the connections to a magnitude below the normal, the spring means becomes operative to separate the clutch members and thereby to release the clutch means to permit it to shift with the abutment and the thrust connections to the new position at which the thrusts are again balanced.

10. In a vehicle, the combination specified in claim 6, in a form wherein the clutch means comprises two members which are movable towards and away from one another along a stationary wedging surface carried upon a member incorporated in the chassis frame, between which wedging surface and an opposed wedging surface on one of the said members is interposed at least one jamming element which is arranged to be thrust into locking engagement with the two wedging surfaces by an abutment surface provided for this purpose upon the other of the said members, and spring means urging the clutch members in the direction away from one another, the arrangement being such that under the normal conditions of loading of the vehicle and with the opposed axle load thrusts on the two sides of the clutch balanced and each at least equal to the normal thrust to obtain in the connections, the clutch means is in locked condition, while upon lessening of the thrust in one or other of the connections to a magnitude below the normal, the spring means becomes operative to separate the clutch members and thereby to release the clutch means to permit it to shift with the abutment and the thrust connections to the new position at which the thrusts are again balanced, and a second abutment surface being provided in the said other of the clutch members for effecting positive disengagement of the jamming element from the wedging surfaces consequent upon the separation of the clutch members.

11. In a vehicle having at least two independently suspended wheels disposed at opposite sides respectively of the vehicle, the combination of a chassis frame, an axle means for one of the wheels, at one side of the vehicle, an axle means for the other wheel, at the other side thereof, the two axle means being separate wheel axles movable relative to the chassis frame in substantially vertical directions as the wheel on one side of the vehicle rises or falls relatively to the wheel on the other side thereof, and a load-taking intermediary in operative interposition between the chassis frame and the two wheel axles for the transference to the latter from the chassis frame of a part at least of the total vehicle weight to be borne by the wheel axles and also between the two wheel axles themselves for the transmission of axle load thrust from the one wheel axle to the other whereby the opposed thrusts from the two wheel axles are caused mutually to balance one another, which load-taking intermediary comprises two resilient shock-absorbing thrust connections interposed in mutually opposed relationship to one another between the respective wheel axles and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced.

12. In a vehicle, the combination specified in claim 11, in a form wherein the wheel axles are carried by one of the relatively movable elements of a vertically disposed plunger and barrel form of mounting for the axle upon the chassis frame, which element constitutes also an abutment for the end of the thrust connection at the end thereof remote from the shifting abutment between the two thrust connections.

13. In a vehicle having at least two wheels disposed at opposite sides respectively of a vehicle, the combination of a chassis frame, an axle means for one of the wheels, at one side of the vehicle, an axle means for the other wheel, at the other side thereof, a load transmitting intermediary in operative interposition between the chassis frame and the two axle means for the transference to the latter from the chassis frame of a part of the total vehicle weight to be borne by the axle means and also between the two axles means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced, and chassis springs intervening directly between the chassis frame and the axle means to transfer to the latter the balance of the said vehicle weight.

14. In a vehicle having at least two wheels disposed at opposite sides respectively of the vehicle, the combination of a chassis frame, an axle means for one of the wheels, at one side of the vehicle, an axle means for the other wheel, at the other side thereof, and a load-taking intermediary in operative interposition between the chassis frame and the two axle means for the transference to the latter from the chassis frame of a part at least of the total vehicle weight to be borne by the axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced, and means for varying the effective resilience of the thrust connections.

15. In a vehicle having at least two wheels disposed at opposite sides respectively of a vehicle, the combination of a chassis frame, an axle means for one of the wheels, at one side of the vehicle, an axle means for the other wheel, at the other side thereof, a load-taking intermediary in operative interposition between the chassis frame and the two axle means for the transference to the latter from the chassis frame of a part of the total vehicle weight to be borne by the axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced, chassis springs intervening directly between the chassis frame and the axle means to transfer to the latter the balance of the said vehicle weight, and means for varying the effective strength of the chassis springs.

16. In a vehicle having at least four wheels, two of which are disposed at the front of the vehicle on opposite sides thereof and two at the rear of the vehicle on opposite sides thereof, the combination of a chassis frame, an axle means for each of the front wheels of the vehicle, an axle means for each of the rear wheels thereof, a load-taking intermediary allocated to the front wheels and in operative interposition between the chassis frame and the two axle means of these wheels for the transference to the said axle means from the chassis frame of a part at least of the total vehicle weight to be borne by these axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced, and a similar load-taking intermediary allocated to the rear wheels of the vehicle and operative in the same manner as the first-mentioned intermediary, the chassis frame constituting, in mutual relationship to the two intermediaries, a medium of transference from the one end of the vehicle to the other of the reaction from the locked intermediary as the two intermediaries operate in succession, whereby the vehicle is assisted in the maintenance of its lateral level during the shift of the abutment first of one intermediary and then of the other.

17. In a vehicle, the combination specified in claim 16, in a form wherein the thrust connections comprise linear thrust intermediaries, of which a section is elastic and consists of a spring, and another section is inelastic and includes a portion which travels along a non-rectilinear path in the shock absorbing movement of the intermediary and in the displacement thereof with the shifting of the abutment, and consists of a line of anti-friction rolling elements guided to move along the said path.

18. In a vehicle, the combination specified in claim 16, in a form wherein the thrust connections comprise linear thrust intermediaries, of which a section is elastic and consists of a spring, and another section is inelastic and includes a portion which travels along a non-rectilinear path in the shock absorbing movement of the intermediary and in the displacement thereof with the shifting of the abutment, and consists of a linear body of fluid contained and guided in an enclosing conduit.

19. In a vehicle having at least four wheels, two of which are disposed at the front of the vehicle on opposite sides thereof and two at the rear of the vehicle on opposite sides thereof, the combination of a chassis frame, an axle means for each of the front wheels of the vehicle, an axle means for each of the rear wheels thereof, a load-taking intermediary allocated to the front wheels and in operative interposition between the chassis frame and the two axle means of these wheels for the transference to the said axle means from the chassis frame of a part at least of the total vehicle weight to be borne by these axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating a double-acting clutch means automatically operative to lock the abutment in any position in the path of shift thereof when the opposed thrusts in the thrust connections are substantially balanced, the clutch being ineffective and operative to release the abutment for shifting movement to a new position in its path at which the thrusts from the connections are again balanced, whenever the thrust in one of the connections falls below normal and in consequence the opposed thrusts in the connections become unbalanced, and a similar load-taking intermediary allocated to the rear wheels of the vehicle and operative in the same manner as the first-mentioned intermediary, the chassis frame constituting, in mutual relationship to the two intermediaries, a medium of transference from the one end of the vehicle to the other of the reaction from the locked intermediary as the two intermediaries operate in succession, whereby the vehicle is assisted in the maintenance of its lateral level during the shift of the abutment first of one intermediary and then of the other.

20. In a vehicle, the combination specified in claim 19, in a form wherein the clutch means comprises two members which are movable towards and away from one another along a stationary wedging surface between which and an opposed wedging surface on one of the said members is interposed at least one jamming element which is arranged to be thrust into locking engagement with the two wedging surfaces by an abutment surface provided for this purpose upon the other of the said members, and spring means urging the clutch members in the direction away from one another, the arrangement being such that under the normal conditions of loading of the vehicle and with the opposed axle load thrusts on the two sides of the clutch balanced and each at least equal to the normal thrust to obtain in the connections, the clutch means is in locked condition, while upon lessening of the thrust in one or other of the connections to a magnitude below the normal, the spring means becomes operative to separate the clutch members and thereby to release the clutch means to permit it to shift with the abutment and the thrust connections to the new position at which the thrusts are again balanced.

21. In a vehicle, the combination specified in claim 19, in a form wherein the clutch means comprises two members which are movable towards and away from one another along a stationary wedging surface between which and an opposed wedging surface on one of the said members is interposed at least one jamming element which is arranged to be thrust into locking engagement with the two wedging surfaces by an abutment surface provided for this purpose upon the other of the said members, and spring means urging the clutch members in the direction away from one another, the arrangement being such that under the normal conditions of loading of the vehicle and with the opposed axle load thrusts on the two sides of the clutch balanced and each at least equal to the normal thrust to obtain in the connections, the clutch means is in locked condition, while upon lessening of the thrust in one or other of the connections to a magnitude below the normal, the spring means becomes operative to separate the clutch members and thereby to release the clutch means to permit it to shift with the abutment and the thrust connections to the new position at which the thrusts are again balanced, and a second abutment surface being provided in the said other of the clutch members for effecting positive disengagement of the jamming element from the wedging surfaces consequent upon the separation of the clutch members.

22. In a steerable vehicle having at least two wheels disposed at opposite sides of the vehicle, the combination of a chassis frame, an axle means for one of the wheels, at one side of the vehicle, an axle means for the other wheel, at the other side thereof, a steering gear, a load-taking intermediary in operative interposition between the chassis frame and the two axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced, and means automatically actuated from the steering gear for varying the effective resilience of the thrust connections so as to stiffen the same when the vehicle is turning a corner.

23. In a steerable vehicle having at least two wheels disposed at opposite sides of the vehicle, the combination of a chassis frame, an axle means for one of the wheels, at one side of the vehicle, an axle means for the other wheel, at the other side thereof, a steering gear, a load-taking intermediary in operative interposition between the chassis frame and the two axle means and also between the two axle means themselves for the transmission of axle load thrust from the one axle means to the other whereby the opposed thrusts from the two axle means are caused mutually to balance one another, which load-taking intermediary comprises two resilient shock-absorbing thrust connections interposed in mutually opposed relationship to one another between the respective axle means and a shifting abutment common to both of the connections and incorporating automatic means for locking it in any position in its path of shift when the opposed thrusts in the thrust connections are substantially balanced, the locking means being ineffective and operative to release the abutment for shifting movement to a new position in its path at which the thrusts from the connections are again balanced, whenever the thrust in one of the connections falls below normal and in consequence the opposed thrusts in the connections become unbalanced, chassis springs intervening directly between the chassis frame and the axle means and means automatically actuated from the steering gear for varying the effective strength of the chassis springs so as to stiffen the same when the vehicle is turning a corner.

BERNARD JAMES ALLEN.